US008544752B2

(12) United States Patent
Adachi

(10) Patent No.: US 8,544,752 B2
(45) Date of Patent: Oct. 1, 2013

(54) NONVOLATILE MEMORY CARD ADAPTABLE TO PLURAL SPECIFICATIONS

(75) Inventor: Masaharu Adachi, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 1824 days.

(21) Appl. No.: 11/596,563

(22) PCT Filed: Mar. 14, 2006

(86) PCT No.: PCT/JP2006/305482
§ 371 (c)(1),
(2), (4) Date: Nov. 14, 2006

(87) PCT Pub. No.: WO2006/101057
PCT Pub. Date: Sep. 28, 2006

(65) Prior Publication Data
US 2008/0257955 A1 Oct. 23, 2008

(30) Foreign Application Priority Data

Mar. 24, 2005 (JP) .................................. 2005-085960

(51) Int. Cl.
*G06K 7/00* (2006.01)
(52) U.S. Cl.
USPC ............ 235/492; 235/435; 235/441; 235/487
(58) Field of Classification Search
USPC .................................. 235/435, 441, 487, 492
See application file for complete search history.

(56) References Cited

U.S. PATENT DOCUMENTS

| 6,681,991 | B1 * | 1/2004 | Li ................................. | 235/439 |
| 2003/0229746 | A1 * | 12/2003 | Liu et al. ....................... | 710/301 |
| 2004/0060988 | A1 | 4/2004 | Sakamoto et al. | |
| 2004/0070952 | A1 | 4/2004 | Higuchi et al. | |
| 2004/0089717 | A1 * | 5/2004 | Harari et al. .................. | 235/441 |
| 2004/0232248 | A1 * | 11/2004 | Cho .............................. | 235/492 |
| 2005/0086433 | A1 * | 4/2005 | Okaue et al. .................. | 711/115 |
| 2005/0105360 | A1 * | 5/2005 | Takiar et al. .................. | 365/222 |

FOREIGN PATENT DOCUMENTS

| JP | 09-134232 | 5/1997 |
| JP | 2001-209773 | 8/2001 |
| JP | 2002-032715 | 1/2002 |
| JP | 2002-073522 | 3/2002 |
| JP | 2003-030613 A | 1/2003 |
| JP | 3091910 | 2/2003 |
| JP | 2003-067678 A | 3/2003 |
| JP | 3094263 | 6/2003 |
| JP | 2003-186582 | 7/2003 |
| JP | 2003-196603 | 7/2003 |
| JP | 2004-110255 | 4/2004 |
| JP | 2004-145870 | 5/2004 |
| WO | WO-01/84490 A1 | 11/2001 |
| WO | WO-2004/034318 A1 | 4/2004 |

* cited by examiner

*Primary Examiner* — Michael G Lee
*Assistant Examiner* — Matthew Mikels
(74) *Attorney, Agent, or Firm* — Dickstein Shapiro LLP

(57) ABSTRACT

A nonvolatile memory card includes memory card controllers conforming to two or more different specifications, a memory card controller changeover switch configured to enable one of the memory card controllers in response to an indication supplied from an exterior, and a nonvolatile memory that has data therein written from and data therein read to an external device under control of the enabled one of the memory card controllers.

7 Claims, 10 Drawing Sheets

NONVOLATILE MEMORY CARD ADAPTABLE TO PLURAL SPECIFICATIONS

TECHNICAL FIELD

The present invention relates to a nonvolatile memory card and a memory card adapter that is used together with the nonvolatile memory card.

BACKGROUND ART

Various types of small-size nonvolatile memory cards are utilized as memory medium for, use in portable digital equipment such as portable phones or digital cameras and also for use in desktop digital equipment such as personal computers or printers. Representative examples include Multi Media Card (registered trademark); SD Card (registered trademark), miniSD Card (registered trademark), xD-Picture Card (registered trademark), MemoryStick (registered trademark), Compact Flash (registered trademark), microSD (registered trademark), TransFlash (registered trademark), MemoryStickPro (registered trademark), MemoryStickDuo (registered trademark), MemoryStickProDuo (registered trademark), etc.

The nonvolatile memory cards listed above are not compatible with each other in terms of control procedure, communication method, electrical characteristics, and/or the shape of the receptacle that receives a card. For example, a nonvolatile memory card of a given type (given specification) cannot be used with the receptacle designed for a nonvolatile memory card of another type (another specification).

FIG. 11 is a block diagram showing a schematic configuration of a related-art nonvolatile memory card 102 and memory card host apparatus 106. As shown in FIG. 11, the related-art nonvolatile memory card 102 includes only one memory card controller 112 of a given type. The memory card controller 112 conforms to a given specification, and is not compatible with a memory card host controller 110 conforming to a different specification.

As shown in FIG. 11, a card receptacle 108 that is coupled to the memory card host controller 110 conforming to a given specification is designed such as to receive a nonvolatile memory card 102 having a matching configuration. If the specification of the nonvolatile memory card 102 differs from the specification of the card receptacle 108 that is coupled to the memory card host controller 110, the nonvolatile memory card 102 cannot be inserted into card receptacle 108.

Several types of memory card adapters are available for the purpose of connecting the nonvolatile memory card 102 conforming to a given specification to the memory card host apparatus 106 conforming to a different specification. However, a memory card adapter of a given type can only be used to provide a connection for one combination of a memory card host apparatus 106 and a nonvolatile memory card 102. Namely, the use of memory card adapters may not be so effective unless memory card adapters are provided as many as there are different combinations between the memory card host apparatus 106 and the nonvolatile memory card 102.

The inventions disclosed in Patent Document 1, Patent Document 2, and Patent Document 3 utilize memory card adapters. These memory card adapters do not have a nonvolatile memory card controller embedded therein, and do not have the switch for switching nonvolatile memory card controllers provided in a nonvolatile memory card. In the inventions disclosed in Patent Document 4, Patent Document 5, and Patent Document 6, a data transmission method converter is implemented in a nonvolatile memory card host controller. However, no memory card adapter is used. The invention disclosed in Patent Document 7 utilizes a memory card adapter, and a data transmission method converter is implemented.

[Patent Document 1] Japanese Patent Application Publication No. 2002-032715
[Patent Document 2] Japanese Utility Model Registration No. 3094263
[Patent Document 3] Japanese Patent Application Publication No. 2003-196603
[Patent Document 4] Japanese Patent Application Publication No. 2002-73522
[Patent Document 5] Japanese Patent Application Publication No. 2003-186582
[Patent Document 6] Japanese Patent Application Publication No. 2004-110255
[Patent Document 7] Japanese Utility Model Registration No. 3091910

Accordingly, there is a need for a nonvolatile memory card that can be used with various types of memory card host controllers conforming to different specifications.

DISCLOSURE OF INVENTION

It is a general object of the present invention to provide a nonvolatile memory card that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a nonvolatile memory card particularly pointed out in the specification in such full, clear, concise, and exact terms as to enable a person having ordinary skill in the art to practice the invention.

To achieve these and other advantages in accordance with the purpose of the invention, the invention provides a nonvolatile memory card which includes memory card controllers conforming to two or more different specifications, a memory card controller changeover switch configured to enable one of the memory card controllers in response to an indication supplied from an exterior, and a nonvolatile memory that has data therein written from and data therein read to an external device under control of the enabled one of the memory card controllers.

According to at least one embodiment of the present invention, a nonvolatile memory card can be used with any one of a plurality of different types of memory card host apparatuses.

Other objects and further features of the present invention will be apparent from the following detailed description when read in conjunction with the accompanying drawings.

Figure 2:
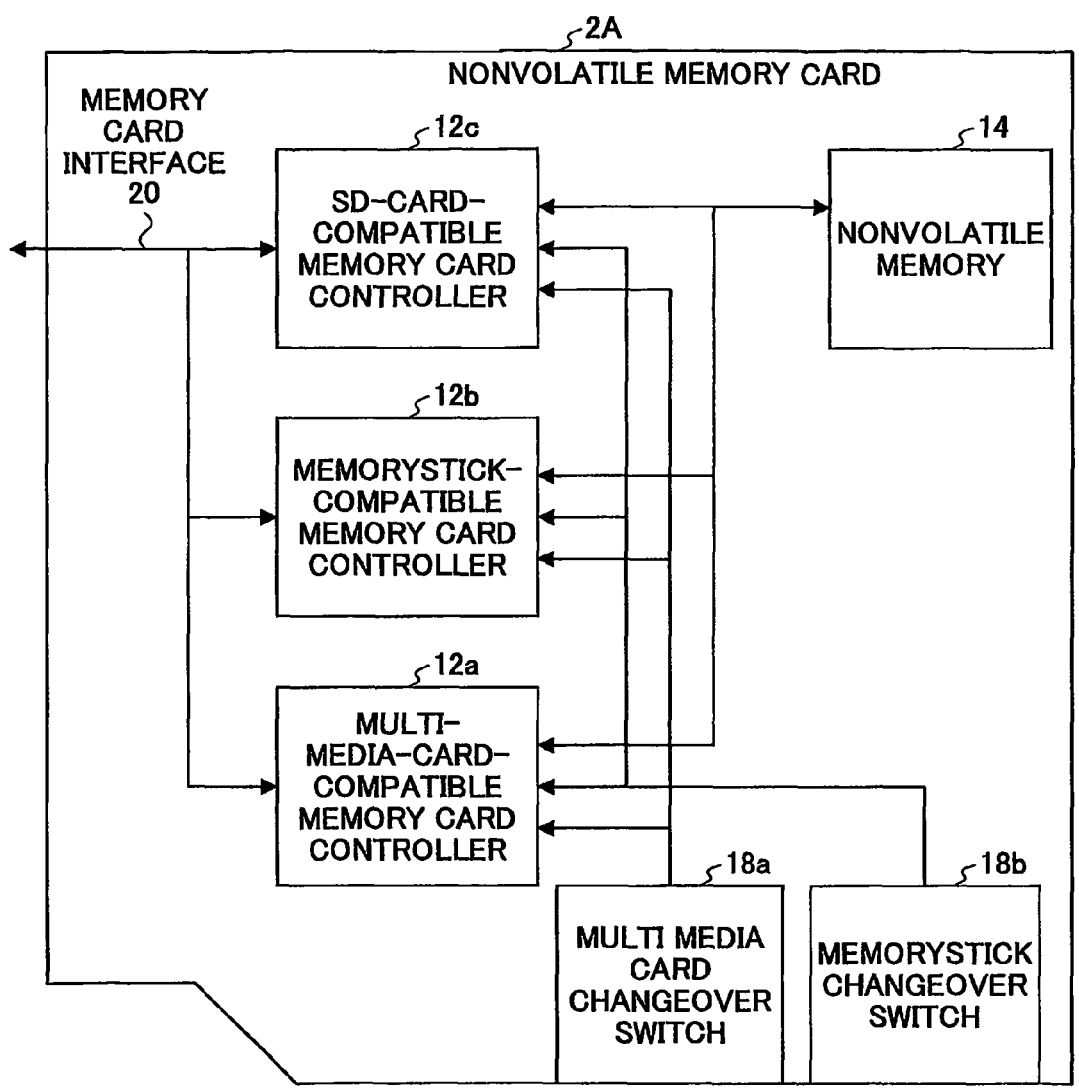
FIG. 2 is a block diagram showing an example of the nonvolatile memory card according to the first embodiment of the present invention.
Figure 4:
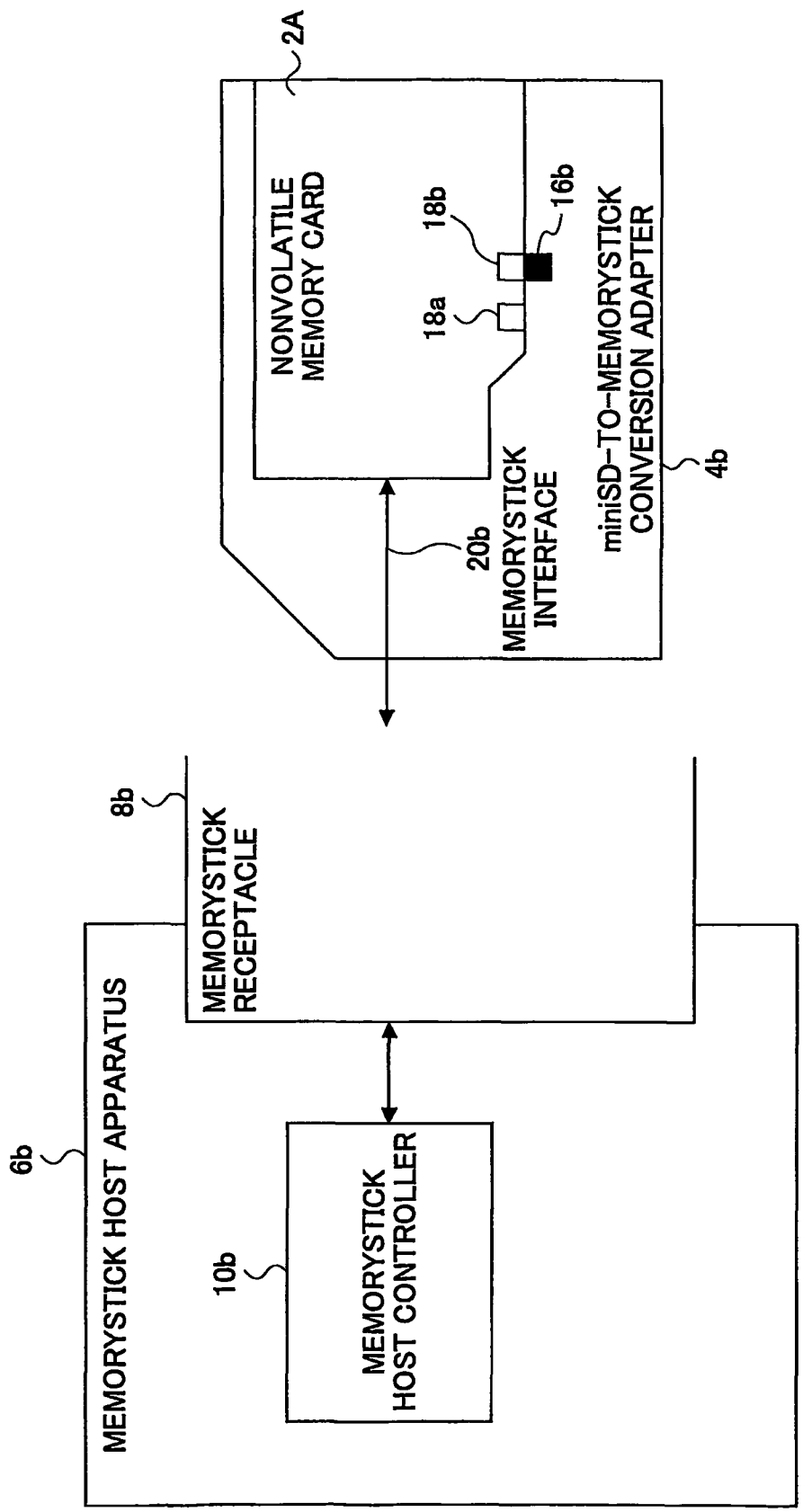

FIG. 4 is a block diagram showing an overall configuration in a case in which the nonvolatile memory card according to the first embodiment of the present invention shown in FIG. 2 is inserted into a miniSD-to-MemoryStick conversion adapter, which is further inserted into a memory card host apparatus that complies with the MemoryStick specification.

Figure 5:
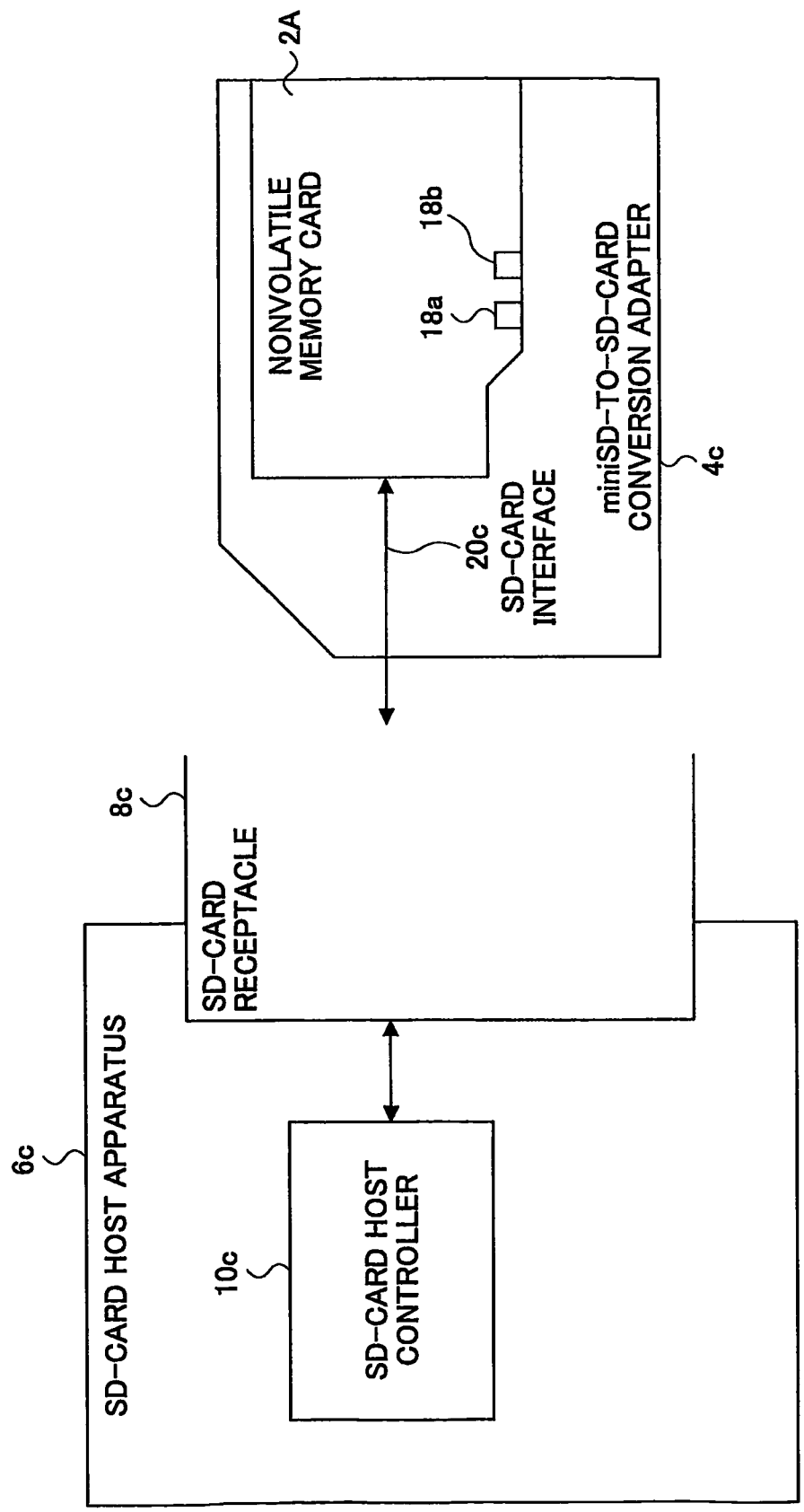

FIG. 5 is a block diagram showing an overall configuration in a case in which the nonvolatile memory card according to the first embodiment of the present invention shown in FIG. 2 is inserted into a miniSD-to-SD-Card conversion adapter, which is further inserted into a memory card host apparatus that complies with the SD Card specification.

Figure 6:
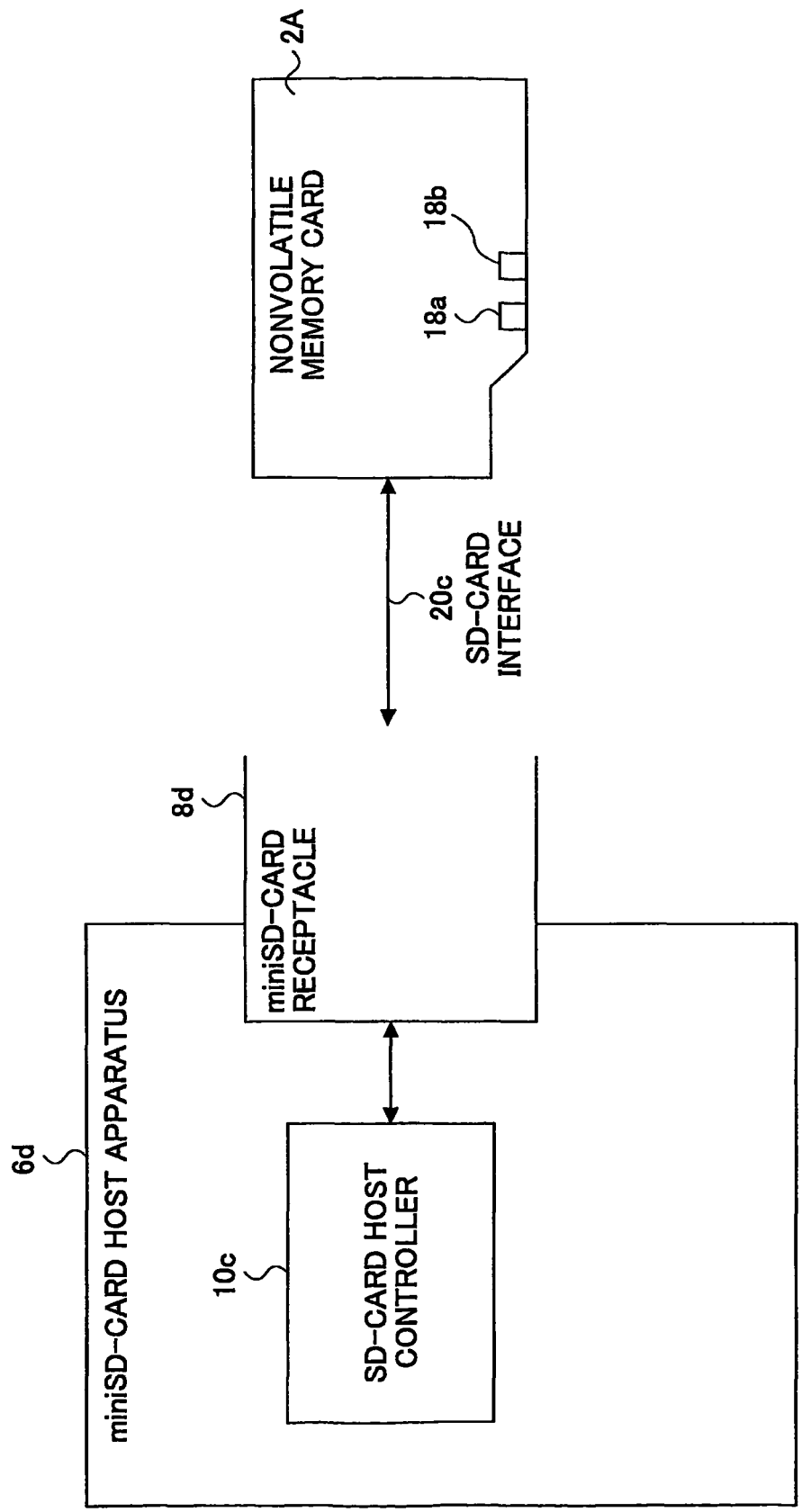

FIG. 6 is a block diagram showing an overall configuration in a case in which the nonvolatile memory card according to the first embodiment of the present invention shown in FIG. 2 is inserted, without using a memory card adapter, into a memory card host apparatus that complies with the miniSD Card specification.

Figure 7:
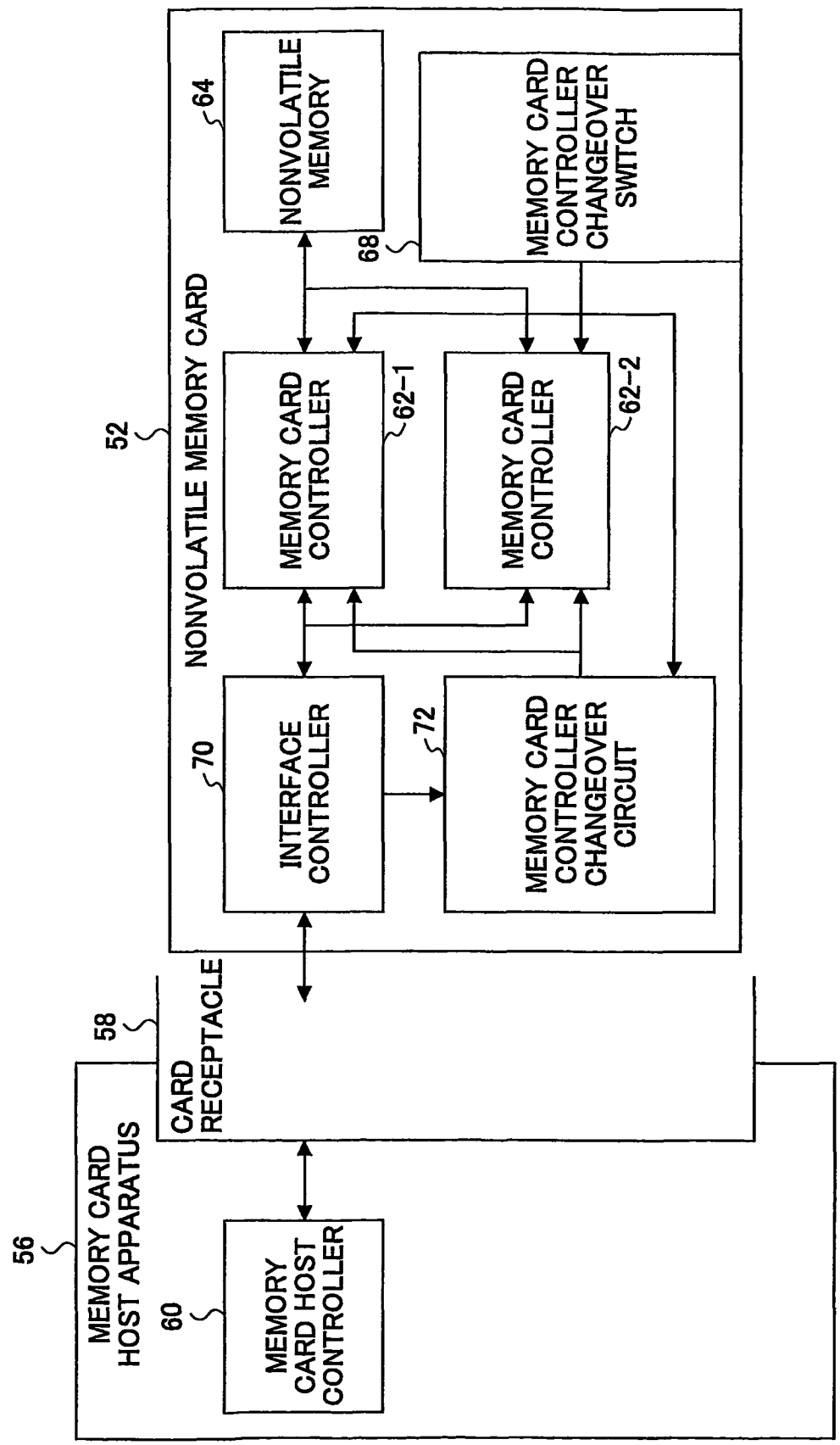

FIG. 7 is a block diagram of a nonvolatile memory card and a memory card host apparatus according to a second embodiment of the present invention.

Figure 8:
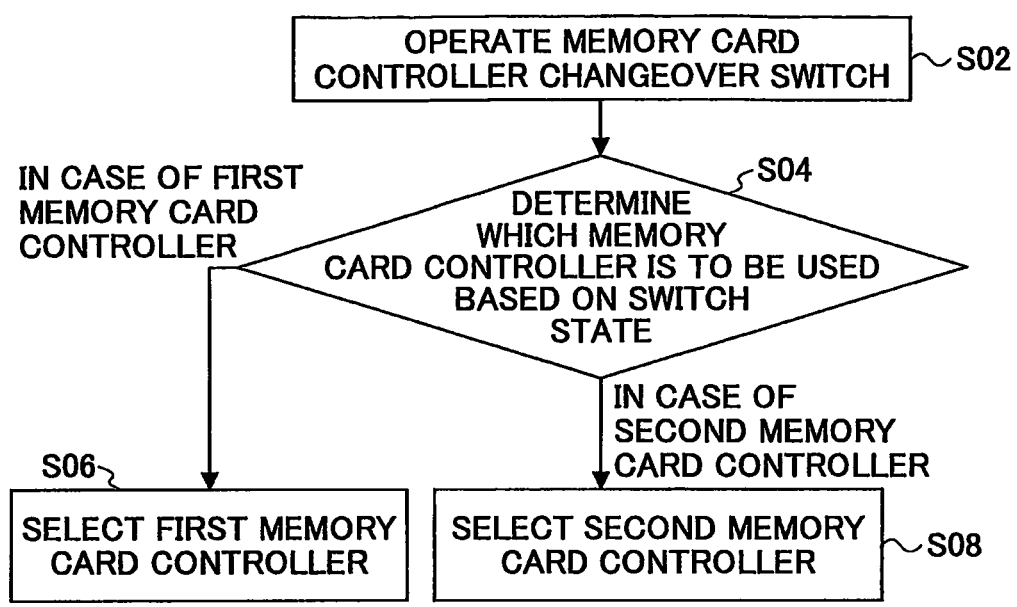

FIG. 8 is a flowchart showing selection that is made only based on a memory card controller changeover switch.

Figure 9:
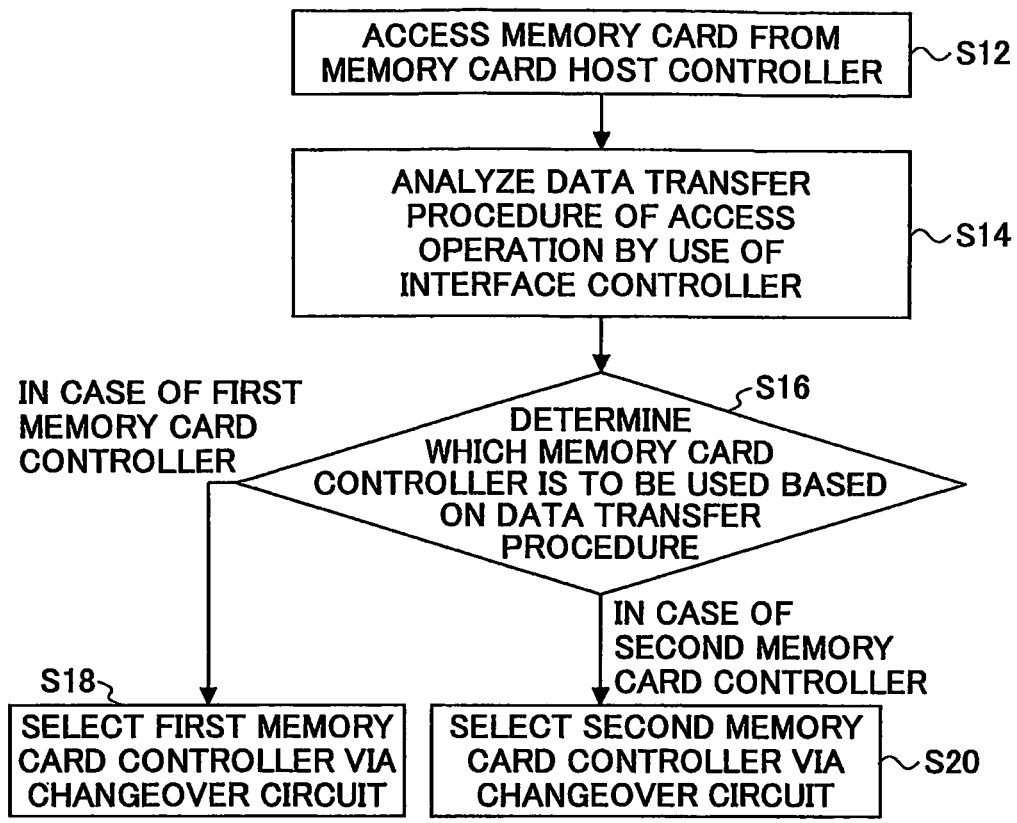

FIG. 9 is a flowchart showing selection that is made only based on the signals of an interface controller.

FIG. 10 is a flowchart showing selection that is made based on the signals of the interface controller and the memory card controller changeover switch.

Figure 11:
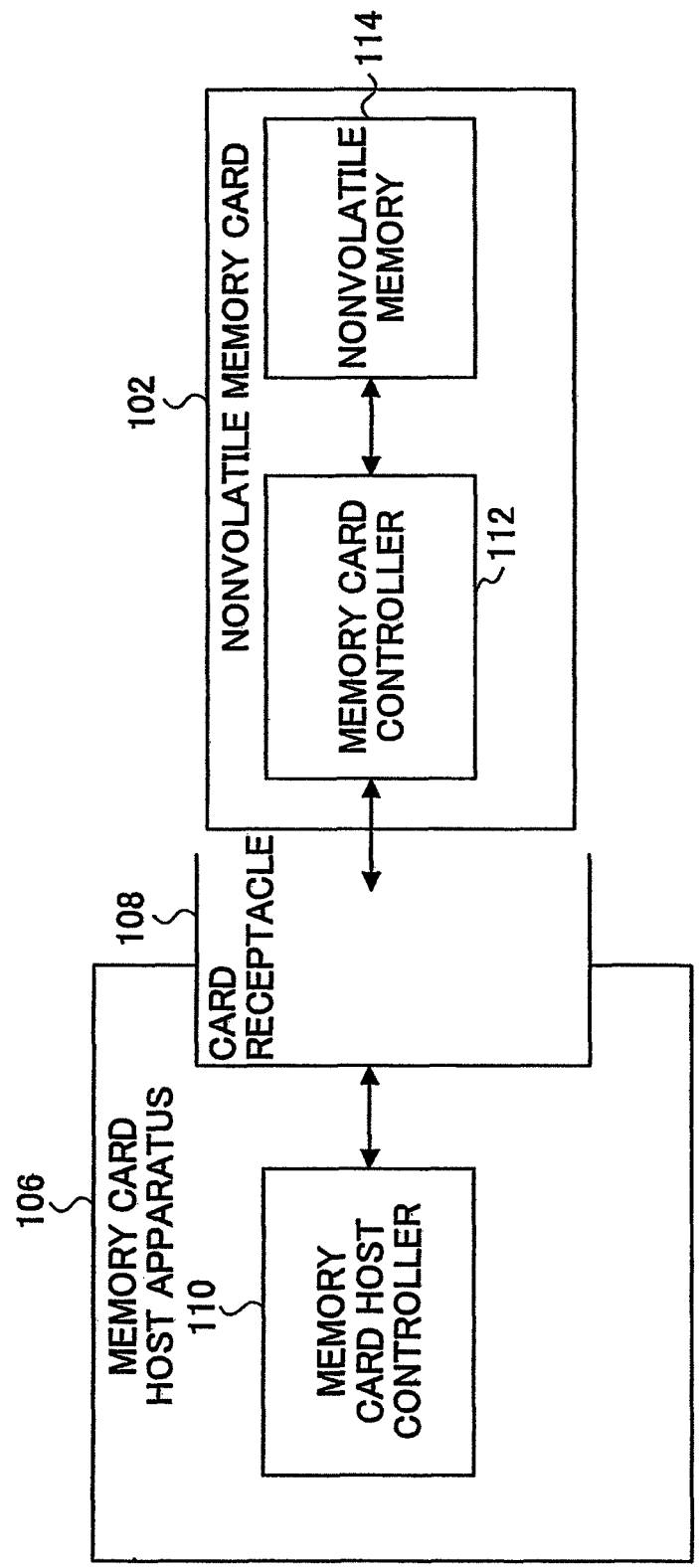

FIG. 11 is a block diagram showing a schematic configuration of a related-art nonvolatile memory card and memory card host apparatus.

BEST MODE FOR CARRYING OUT THE INVENTION

In the following, embodiments of the present invention will be described with reference to the accompanying drawings.

First Embodiment

Figure 1:
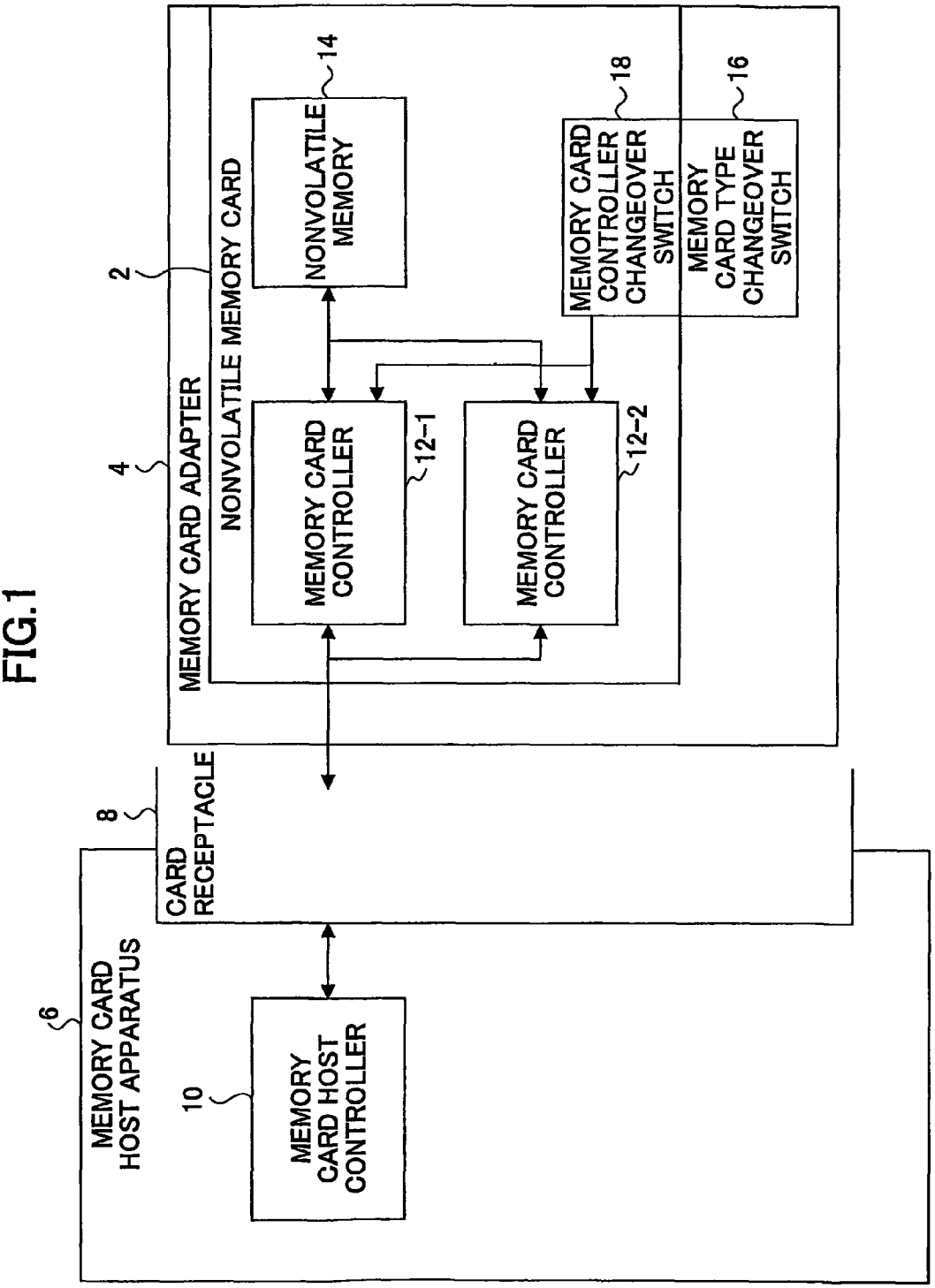
FIG. 1 is a block diagram of a nonvolatile memory card, a memory card adapter, and a memory card host apparatus according to a first embodiment of the present invention.

FIG. 1 is a block diagram of a nonvolatile memory card 2, a memory card adapter 4, and a memory card host apparatus 6 according to a first embodiment of the present invention. The memory card host apparatus 6 may be a conventional portable phone or personal computer, for example, and utilizes the nonvolatile memory card 2 as memory medium. The memory card host apparatus 6 includes a memory card host controller 10 for controlling data transmission to/from the nonvolatile memory card 2, and also includes a card receptacle 8 into which a memory card is inserted at the time of use of the memory card.

The memory card adapter 4 serves to provide a connection between the memory card host apparatus 6 and the nonvolatile memory card 2 when the specification of the memory card host apparatus and the card receptacle 8 does not match the specification of the nonvolatile memory card 2. When the nonvolatile memory card 2 is inserted into the memory card adapter 4, and the memory card adapter 4 is then inserted into the card receptacle 8, the memory card host apparatus 6 can use the nonvolatile memory card 2 as memory medium.

The nonvolatile memory card 2 according to the first embodiment includes a nonvolatile memory 14 and two or more memory card controllers 12-1 and 12-2 (two in FIG. 1) provided on a nonvolatile memory card substrate. The memory card controllers need to be provided so as to conform to the specifications of memory card host apparatuses 6 to which a connection is expected.

When data transmission is performed between the memory card host apparatus 6 and the nonvolatile memory card 2, one of the two or more memory card controllers 12-1 and 12-2 is selected, so that the selected memory card controller operates, as will later be described. An appropriate memory card controller is chosen through the operation of a memory card controller changeover switch 18 provided in the nonvolatile memory card 2. The memory card controller changeover switch 18 may be an electrical and/or physical external terminal, or may be a changeover switch.

The memory card adapter 4 according to the first embodiment includes a memory card type changeover switch 16. The memory card type changeover switch 16 may be an electrical and/or physical external terminal, or may be a changeover switch, which is provided in the memory card adapter. The memory card type changeover switch 16 controls the memory card controller changeover switch 18 of the nonvolatile memory card 2 that is inserted.

The nonvolatile memory card 2 of the first embodiment is inserted into the memory card adapter of the first embodiment, and, then, the memory card adapter 4 is inserted into the memory card host apparatus 6. With this provision, the memory card type changeover switch 16 of the memory card adapter controls the memory card controller changeover switch 18 of the nonvolatile memory card 2. Under the control of the memory card type changeover switch 16, the memory card controller changeover switch 18 serves to select one of the two or more memory card controllers. The memory card host controller 10 of the memory card host apparatus 6 writes data to or reads data from the nonvolatile memory 14 of the nonvolatile memory card 2 by use of an appropriate one of the memory card controllers 12-1 and 12-2.

Namely, the memory card type changeover switch 16 of the memory card adapter 4 determines which one of the memory card controllers 12-1 and 12-2 provided in the memory card adapter 4 is an appropriate one to use.

FIG. 2 is a block diagram showing an example of the nonvolatile memory card according to the first embodiment of the present invention. This example of the nonvolatile memory card is a miniSD nonvolatile memory card that can conform to Multi Media Card, MemoryStick, and SD Card. Namely, the exterior of this nonvolatile memory card has the shape of a miniSD card, but this nonvolatile memory card is designed to be used with a memory card host apparatus 6 that complies with the specification of Multi Media Card, MemoryStick, SD Card, or miniSD. Since the exterior shape is the same as that of a miniSD, a memory card adapter for a relevant combination is necessary when the nonvolatile memory card is to be connected to a host apparatus that complies with one of the Multi Media Card specification, MemoryStick specification, and SD Card specification.

A nonvolatile memory card 2A shown in FIG. 2 includes a Multi-Media-Card-compatible memory card controller 12a, a MemoryStick-compatible memory card controller 12b, and an SD-Card-Compatible memory card controller 12c. A Multi Media Card changeover switch 18a and a MemoryStick changeover switch 18b may be an electrical and/or physical external terminal, or may be a changeover switch. These switches are placed in an open state when not used.

The Multi Media Card changeover switch 18a and the MemoryStick changeover switch 18b are provided for a host apparatus complying with the Multi Media Card specification and a host apparatus complying with the MemoryStick specification, respectively. The Multi Media Card changeover switch 18a and the MemoryStick changeover switch 18b are controlled by the memory card type changeover switch 16 provided in the memory card adapter 4.

As will be described later in detail, when the Multi Media Card changeover switch 18a is in a closed state and the MemoryStick changeover switch 18b is in an open state under the control of the memory card type changeover switch 16, the Multi-Media-Card-compatible memory card controller 12a is selected and enabled. When the MemoryStick changeover switch 18b is in a closed state and the Multi Media Card changeover switch 18a is in an open state under the control of the memory card type changeover switch 16, the MemoryStick-compatible memory card controller 12b is selected and enabled. When the Multi Media Card changeover switch 18a and the MemoryStick changeover switch 18b are both in the closed state or both in the open state, the SD-Card-Compatible memory card controller 12c is selected and enabled.

Data transmission is then performed via a memory card interface 20 between the enabled one of the memory card controllers and a memory card host apparatus 6 that conforms to this memory card controller. That is, a data write/read operation is performed with respect to the nonvolatile memory 14 via the enabled one of the memory card controllers, which is selected according to the settings of the Multi Media Card changeover switch 18a and the MemoryStick changeover switch 18b.

Figure 3:
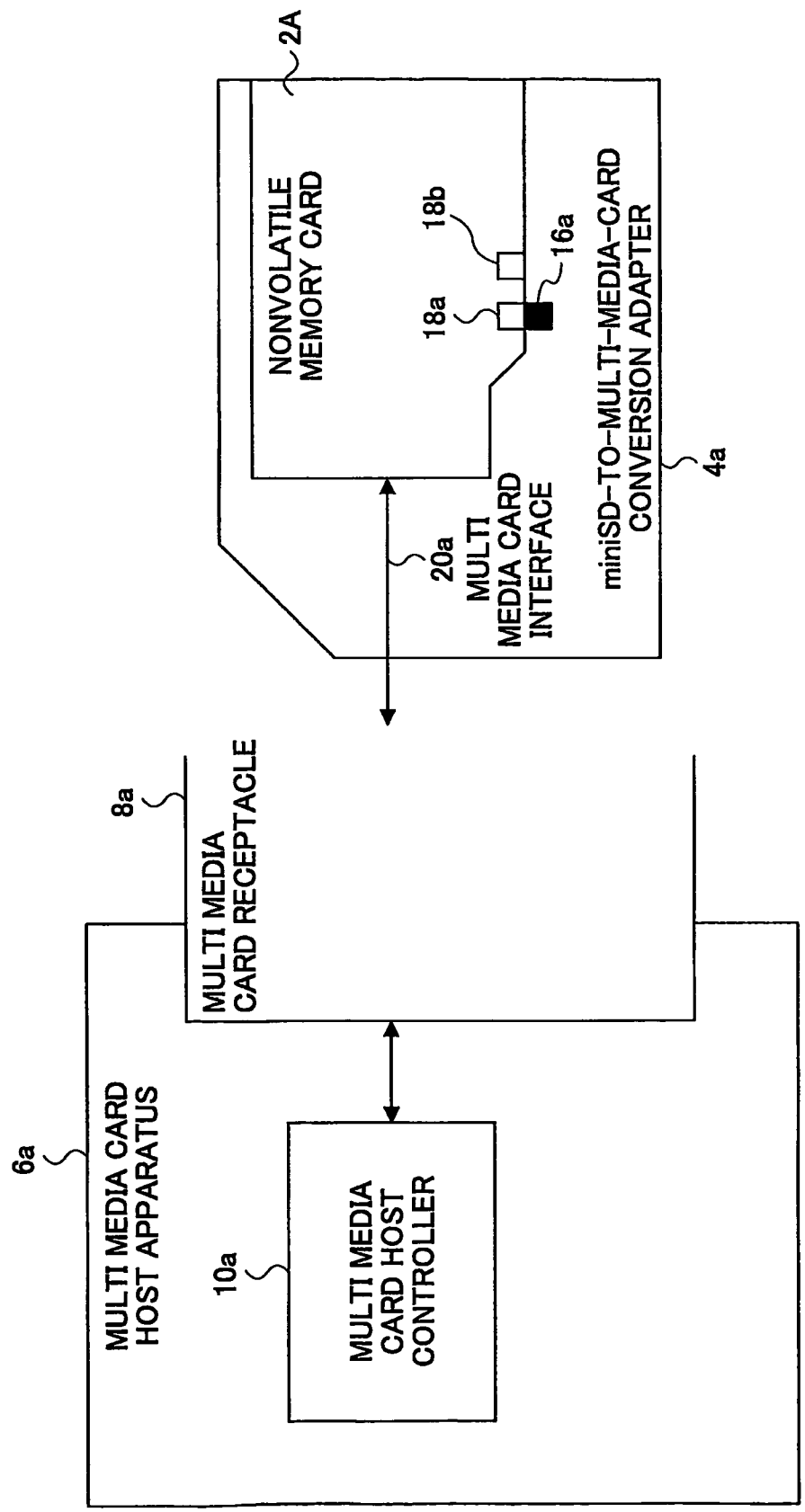
FIG. 3 is a block diagram showing an overall configuration in a case in which the nonvolatile memory card according to the first embodiment of the present invention shown in FIG. 2 is inserted into a miniSD-to-Multi-Media-Card conversion adapter, which is further inserted into a memory card host apparatus that complies with the Multi Media Card specification.

FIG. 3 is a block diagram showing an overall configuration in a case in which the nonvolatile memory card 2A according to the first embodiment of the present invention shown in FIG. 2 is inserted into a miniSD-to-Multi-Media-Card conversion adapter 4a, which is further inserted into a memory card host apparatus (Multi-Media-Card host apparatus 6a) that complies with the Multi Media Card specification.

When the nonvolatile memory card 2A is inserted into the miniSD-to-Multi-Media-Card conversion adapter 4a, a miniSD-to-Multi-Media-Card changeover switch 16a of the miniSD-to-Multi-Media-Card conversion adapter 4a comes electrically and/or physically in contact with the Multi Media Card changeover switch 18a of the nonvolatile memory card 2. As a result, the Multi Media Card changeover switch 18a is placed in the closed state while the MemoryStick changeover switch 18b stays in the open state.

Since the MemoryStick changeover switch 18b is in the open state, and the Multi Media Card changeover switch 18a is in the closed state, the Multi-Media-Card-compatible memory card controller 12a is selected in the nonvolatile memory card 2A.

Accordingly, the nonvolatile memory card 2A inserted into the miniSD-to-Multi-Media-Card conversion adapter 4a is now compatible with a Multi Media Card in terms of control procedure, communication method, electrical characteristics, and card shape. Data transfer via a Multi Media Card interface 20a can thus be performed between the nonvolatile memory card 2A and a Multi Media Card host controller 10a of the Multi-Media-Card host apparatus 6a having a Multi Media Card receptacle 8a.

FIG. 4 is a block diagram showing an overall configuration in a case in which the nonvolatile memory card 2A according to the first embodiment of the present invention shown in FIG. 2 is inserted into a miniSD-to-MemoryStick conversion adapter 4b, which is further inserted into a memory card host apparatus (MemoryStick host apparatus 6b) that complies with the MemoryStick specification.

When the nonvolatile memory card 2A is inserted into the miniSD-to-MemoryStick conversion adapter 4b, a miniSD-to-MemoryStick changeover switch 16b of the miniSD-to-MemoryStick conversion adapter 4b comes electrically and/or physically in contact with the MemoryStick changeover switch 18b of the nonvolatile memory card 2. As a result, the MemoryStick changeover switch 18b is placed in the closed state while the Multi Media Card changeover switch 18a stays in the open state.

Since the Multi Media Card changeover switch 18a is in the open state, and the MemoryStick changeover switch 18b is in the closed state, the MemoryStick-compatible memory card controller 12b is selected in the nonvolatile memory card 2A.

Accordingly, the nonvolatile memory card 2A inserted into the miniSD-to-MemoryStick conversion adapter 4b is now compatible with a MemoryStick in terms of control procedure, communication method, electrical characteristics, and card shape. Data transfer via a MemoryStick interface 20b can thus be performed between the nonvolatile memory card 2A and a MemoryStick host controller 10b of the MemoryStick host apparatus 6b having a MemoryStick receptacle 8b.

FIG. 5 is a block diagram showing an overall configuration in a case in which the nonvolatile memory card 2A according to the first embodiment of the present invention shown in FIG. 2 is inserted into a miniSD-to-SD-Card conversion adapter 4c, which is further inserted into a memory card host apparatus (SD-Card host apparatus 6c) that complies with the SD Card specification.

The miniSD-to-SD-Card conversion adapter 4c does not have a switch that comes electrically and/or physically in contact with any one of the Multi Media Card changeover switch 18a and the MemoryStick changeover switch 18b of the nonvolatile memory card 2A when the nonvolatile memory card 2A is inserted into the miniSD-to-SD-Card conversion adapter 4c. As a result, both the Multi Media Card changeover switch 18a and the MemoryStick changeover switch 18b stay in the open state even when the nonvolatile memory card 2A is inserted into the miniSD-to-SD-Card conversion adapter 4c.

Since the Multi Media Card changeover switch 18a and the MemoryStick changeover switch 18b are both in the open state, the SD-Card-Compatible memory card controller 12c is selected in the nonvolatile memory card 2A.

Accordingly, the nonvolatile memory card 2A inserted into the miniSD-to-SD-Card conversion adapter 4c is now compatible with a SD Card in terms of control procedure, communication method, electrical characteristics, and card shape. Data transfer via a SD Card interface 20c can thus be performed between the nonvolatile memory card 2A and an SD Card host controller 10c of the SD-Card host apparatus 6c having a SD Card receptacle 8c.

FIG. 6 is a block diagram showing an overall configuration in a case in which the nonvolatile memory card 2A according to the first embodiment of the present invention shown in FIG. 2 is inserted, without using a memory card adapter, into a memory card host apparatus (miniSD-Card host apparatus 6d) that complies with the miniSD Card specification. The nonvolatile memory card 2A has the exterior shape that is the same as that of the miniSD Card Accordingly, if the miniSD-Card host apparatus 6d has a miniSD Card receptacle 8d for use for a miniSD Card, the nonvolatile memory card 2A can be connected directly to the SD-Card host apparatus 6c.

Since the nonvolatile memory card 2A is not inserted into a memory card adapter, none of the Multi Media Card changeover switch 18a and the MemoryStick changeover switch 18b comes in contact with a switch. As a result, both the Multi Media Card changeover switch 18a and the MemoryStick changeover switch 18b stay in the open state.

Since the Multi Media Card changeover switch 18a and the MemoryStick changeover switch 18b are both in the open state, the SD-Card-Compatible memory card controller 12c is selected in the nonvolatile memory card 2A.

In this manner, the nonvolatile memory card 2A that is not inserted into a memory card adapter is compatible with a miniSD Card in terms of control procedure, communication method, electrical characteristics, and card shape. Data transfer via a SD Card interface 20c can thus be performed between the nonvolatile memory card 2A and an SD Card host controller 10c of the miniSD-Card host apparatus 6d having a miniSD Card receptacle 8d.

Second Embodiment

FIG. 7 is a block diagram of a nonvolatile memory card 52 and a memory card host apparatus 56 according to a second embodiment of the present invention. The memory card host apparatus 56 may be a conventional portable phone or personal computer, for example, and utilizes the nonvolatile memory card 52 as memory medium. The memory card host apparatus 56 includes a memory card host controller for controlling data transmission to/from the nonvolatile memory card 52, and also includes a card receptacle 58 into which a memory card is inserted at the time of use of the memory card.

In the first embodiment described above, the memory card adapter 4 is used for connection between the nonvolatile memory card 2 and the card receptacle 8 as such need arises. In the second embodiment of the present invention, a memory card controller changeover circuit 72 is embedded in the nonvolatile memory card 52. With this provision, the nonvolatile memory card 52 does not necessarily have a memory card controller changeover switch (employed in the first embodiment) provided therein. The shape and pin arrangement of the nonvolatile memory card may be compatible with the card shape and pin arrangement that are anticipated by the memory card host apparatus 56. The nonvolatile memory card 52 of the second embodiment may be connected to the card receptacle 58 without using a memory card adapter.

An example of the nonvolatile memory card having the memory card controller changeover circuit 72 according to the second embodiment may be a nonvolatile memory card that can conform to the Multi Media Card specification and the SD Card specification. When this nonvolatile memory card is inserted into the card receptacle of a Multi Media Card host apparatus, the memory card controller changeover circuit 72 of the nonvolatile memory card analyzes data signals so as to select a Multi Media Card controller in the nonvolatile memory card. When this nonvolatile memory card is inserted into the card receptacle of an SD Card host apparatus, the memory card controller changeover circuit 72 of the nonvolatile memory card analyzes data signals so as to select an SD Card controller in the nonvolatile memory card.

Referring to FIG. 7 again, a description will be given of the second embodiment. The nonvolatile memory card 52 according to the second embodiment includes a nonvolatile memory 64, an interface controller 70, the memory card controller changeover circuit 72, and two or more memory card controllers 62-1 and 62-2 (two in FIG. 7) provided on a nonvolatile memory card substrate. The interface controller 70 analyzes data transmitted from a memory card host controller 60 of the memory card host apparatus 56 to determine the specification of the memory card host controller 60 according to the procedure that will be later described. According to the results of the analysis, the interface controller 70 generates a changeover control signal for provision to the memory card controller changeover circuit 72. The memory card controller changeover circuit 72 selects an appropriate one of the two or more memory card controllers in response to the changeover control signal.

The nonvolatile memory card 52 according to the second embodiment may include a memory card controller changeover switch 68. The memory card controller changeover switch 68 may be an electrical and/or physical external terminal, or may be a changeover switch, which is provided on the nonvolatile memory card substrate. As will later be described, switching operation by the memory card controller changeover switch 68 serves to select one of the two or more memory card controllers that is to be enabled.

Data transmission is performed via the interface controller 70 between the selected and enabled one of the memory card controllers and the memory card host controller 60 of the memory card host apparatus 56 that conforms to this memory card controller. That is, a data write/read operation is performed with respect to the nonvolatile memory 64 via the enabled one of the memory card controllers, which is enabled according to the settings of the memory card controller changeover circuit 72 or the memory card controller changeover switch 68.

In the following, an example of the procedure for selecting an appropriate memory card controller in the nonvolatile memory card 52 will be described. FIG. 8 is a flowchart showing selection that is made only based on the memory card controller changeover switch 68. The memory card controller changeover switch 68 is operated (switched) from an exterior (step S02). A determination is made based on the switch state as to which one of the memory card controllers is to be used (step S04). If a first memory card controller is a choice made at step S04, the first memory card controller is selected (step S06). If a second memory card controller is a choice made at step S04, the second memory card controller is selected (step S08).

FIG. 9 is a flowchart showing selection that is made only based on the signals of the interface controller 70. Access data signals are performed from the memory card host controller 60 to the nonvolatile memory card 52 (step S12). The interface controller 70 analyzes the data transfer procedure of the access data signals (step S14). The interface controller 70 determines, based on the analysis, which one of the memory card controllers is to be used (step S16). If a first memory card controller is a choice made at step S16, the memory card controller changeover circuit 72 selects the first memory card controller (step S18). If a second memory card controller is a choice made at step S16, the memory card controller changeover circuit 72 selects the second memory card controller (step S20).

FIG. 10 is a flowchart showing selection that is made based on the signals of the interface controller 70 and the memory card controller changeover switch 68. Access data signals are performed from the memory card host controller 60 to the nonvolatile memory card 52 (step S32). The interface controller 70 analyzes the data transfer procedure of the access data signals (step S34). The interface controller 70 determines, based on the analysis, which one of the memory card controllers is to be used (step S36). If a first memory card controller is a choice made at step S36, the memory card controller changeover circuit 72 selects the first memory card controller (step S38). If a second memory card controller is a choice made at step S36, the memory card controller changeover circuit 72 selects the second memory card controller (step S40). If step S36 does not identify any memory card controller as its choice, a determination is made based on the switch state as to which one of the memory card controllers is to be used (step S42). If a first memory card controller is a choice made at step S42, the first memory card controller is selected (step S44). If a second memory card controller is a choice made at step S42, the second memory card controller is selected (step S46).

In the flowchart shown in FIG. 10 described above, an attempt is first made to determine a memory card controller to be used based on the analysis of the data signals at the interface controller 70. If no determination is made, then, the switch state of the memory card controller changeover switch 68 is referred to as an auxiliary choice. Alternatively, an attempt may first be made to determine a memory card controller to be used based on the switch state of the memory card controller changeover switch 68, and, then, if no determination is made, the signal analysis at the interface controller 70 may be referred to as an auxiliary choice. Such a procedure may as well be utilized to select an appropriate memory card controller.

Further, the present invention is not limited to these embodiments, but various variations and modifications may be made without departing from the scope of the present invention.

The present application is based on Japanese priority application No. 2005-085960 filed on Mar. 24, 2005, with the Japanese Patent Office, the entire contents of which are hereby incorporated by reference.

The invention claimed is:

1. A nonvolatile memory card, comprising:
a memory card interface;
a plurality of memory card controllers conforming to two or more different specifications, which correspond to respective, different memory card types;
a memory card controller changeover switch configured to enable one of the memory card controllers in response to an indication supplied from an exterior; and
a nonvolatile memory that has data therein written from and data therein read to an external device through the memory card interface under control of the enabled one of the memory card controllers, and said memory card interface being used for data exchange with the external device regardless of which one of the memory card controllers is enabled.

2. The nonvolatile memory card as claimed in claim 1, wherein the memory card controller changeover switch is configured to receive the indication from a memory card adapter when the nonvolatile memory card is inserted into the memory card adapter to be connected to a host apparatus.

3. A memory card adapter, comprising:
a receptacle configured to receive a nonvolatile memory card, in which a plurality of types of data transfers and a plurality of memory card controllers are provided, that is inserted thereinto to allow data transfer between the nonvolatile memory card and a host apparatus when the memory card adapter is inserted into the host apparatus; and
a memory card type changeover switch configured to select a type of the data transfer among a plurality of types of data transfers provided in the nonvolatile memory card when the nonvolatile memory card is inserted into the receptacle, the memory card type changeover switch being connected to the nonvolatile memory card through a first path, the first path being separate from a second path through which the data transfer is performed between the nonvolatile memory card and the host apparatus.

4. A nonvolatile memory card, comprising:
a memory card interface;
a plurality of memory card controllers conforming to two or more different specifications, which correspond to respective, different memory card types;
an interface controller configured to analyze a data transfer procedure of access data signals supplied from a host device and to enable one of the memory card controllers in response to a result of the analysis; and
a nonvolatile memory that has data therein written from and data therein read to the host device through the memory card interface under control of the enabled one of the memory card controllers, and said memory card interface being used for data exchange with the host device regardless of which one of the memory card controllers is enabled.

5. A nonvolatile memory card, comprising:
a memory card interface;
a plurality of memory card controllers conforming to two or more different specifications, which correspond to respective, different memory card types;
a memory card controller changeover circuit configured to enable one of the memory card controllers in response to a changeover control signal;
an interface controller configured to analyze a data transfer procedure of access data signals supplied from a host device and to supply the changeover control signal to the memory card controller changeover circuit in response to a result of the analysis; and
a nonvolatile memory that has data therein written from and data therein read to the host device through the memory card interface under control of the enabled one of the memory card controllers, and said memory card interface being used for data exchange with the host device regardless of which one of the memory card controllers is enabled.

6. A nonvolatile memory card, comprising:
a memory card interface;
a plurality of memory card controllers conforming to two or more different specifications, which correspond to respective, different memory card types;
an interface controller configured to analyze a data transfer procedure of access data signals supplied from a host device and to enable one of the memory card controllers in response to a result of the analysis; and
a memory card controller changeover switch configured to enable one of the memory card controllers in response to an indication supplied from an exterior; and
a nonvolatile memory that has data therein written from and data therein read to the host device through the memory card interface under control of the enabled one of the memory card controllers, and said memory card interface being used for data exchange with the host device regardless of which one of the memory card controllers is enabled,
wherein the interface controller and the memory card controller changeover switch are configured such that one of the memory card controllers is enabled in response to the result of the analysis if the result of the analysis indicates one of the memory card controllers, and is enabled in response to the indication supplied from the exterior if the result of the analysis indicates none of the memory card controllers.

7. A method of conducting data transfer between a host apparatus and a nonvolatile memory card when the nonvolatile memory card is inserted into a memory card adapter that is inserted into the host apparatus, said method comprising:
causing the memory card adapter to make a setting to a switch provided in the nonvolatile memory card, said setting to the switch being made through a path separate from a data transfer path through which the data transfer is conducted between host apparatus and the nonvolatile memory card; and selecting one of a plurality of memory card controllers provided in the nonvolatile memory card in response to the setting of the switch.

\* \* \* \* \*